(12) United States Patent
Zhang et al.

(10) Patent No.: US 9,729,295 B2
(45) Date of Patent: Aug. 8, 2017

(54) RESOURCE ALLOCATION IN COMMUNICATIONS SYSTEM

(71) Applicant: Nokia Siemens Networks Oy, Espoo (FI)

(72) Inventors: Li Zhang, Beijing (CN); Timo Erkki Lunttila, Espoo (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 315 days.

(21) Appl. No.: 14/041,431

(22) Filed: Sep. 30, 2013

(65) Prior Publication Data

US 2014/0092790 A1  Apr. 3, 2014

(30) Foreign Application Priority Data

Sep. 28, 2012 (WO) ................. PCT/EP2012/069193

(51) Int. Cl.
*H04L 1/18* (2006.01)
*H04L 5/00* (2006.01)
*H04L 5/14* (2006.01)

(52) U.S. Cl.
CPC .......... *H04L 5/0053* (2013.01); *H04L 1/1861* (2013.01); *H04L 5/001* (2013.01); *H04L 5/0055* (2013.01); *H04L 5/1469* (2013.01)

(58) Field of Classification Search
CPC ... H04L 5/0053; H04L 1/1861; H04L 5/1469; H04L 5/001; H04L 5/0055
USPC ........................................................ 370/280
See application file for complete search history.

(56) References Cited

U.S. PATENT DOCUMENTS

| 2010/0322114 | A1 | 12/2010 | Li et al. ...................... 370/278 |
| 2012/0320846 | A1* | 12/2012 | Papasakellariou et al. .. 370/329 |
| 2012/0320848 | A1* | 12/2012 | Chen ..................... H04L 5/0055 370/329 |
| 2013/0194931 | A1* | 8/2013 | Lee ....................... H04L 5/0053 370/241 |
| 2013/0242890 | A1* | 9/2013 | He et al. ...................... 370/329 |
| 2014/0036810 | A1* | 2/2014 | Harrison ............ H04W 72/042 370/329 |

FOREIGN PATENT DOCUMENTS

| CN | 101442818 A | 5/2009 |
| CN | 102215094 A | 10/2011 |

(Continued)

OTHER PUBLICATIONS

3GPP TSG RAN WG1 Meeting #70; R1-123227; CATT; "PUCCH resource for E-PDCCH"; Qingdao, China, Aug. 13-17, 2012 (3 pages).

(Continued)

*Primary Examiner* — Mohammad Anwar
*Assistant Examiner* — Kokou R Detse
(74) *Attorney, Agent, or Firm* — Harrington & Smith

(57) ABSTRACT

An exemplary embodiment discloses a multi-subframe physical uplink control channel PUCCH resource arrangement for PUCCH format 1a/1b resource allocation for enhanced physical downlink control channel EPDCCH in time division duplex TDD transmission. A definition of a semi-static offset for each EPDCCH set is extended by considering multiple downlink subframes, and a dynamic offset mechanism is enhanced to avoid resource collision between multiple DL subframes.

37 Claims, 5 Drawing Sheets

(56) References Cited

FOREIGN PATENT DOCUMENTS

EP          2 381 735 A1   10/2011
WO   WO-2012/163165 A1   12/2012

OTHER PUBLICATIONS

3GPP TSG-RAN WG1 Meeting #70; R1-123167; Intel Corporation; "PUCCH resource allocation for ePDCCH"; Qingdao, China, Aug. 13-17, 2012 (3 pages).
3GPP TSG RAN WG1 Meeting #70; R1-123623; Research in Motion, UK Limited; "PUCCH Resource Efficiency for E-PDCCH"; Qingdao, P.R. China, Aug. 13-17, 2012 (6 pages).
3GPP TSG-RAN WG2 Meeting #70; R1-123984; Panasonic (offline moderator); "Outcome of the discussion for PUCCH resource of format 1 a/1b for EPDCCH"; Qingdao, China, Aug. 13-17, 2012 (1 page).
3GPP TS 36.213 V11.0.0 (Sep. 2012); 3rd Generation Partnership Project; Technical Specification Group Radio Access Network; Evolved Universal Terrestrial Radio Access (E-UTRA); Physical layer procedures (Release 11) (143 pages).

* cited by examiner

RESOURCE ALLOCATION IN COMMUNICATIONS SYSTEM

FIELD OF THE INVENTION

The exemplary and non-limiting embodiments of this invention relate generally to wireless communications networks, and more particularly to resource allocation.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

PUCCH (physical uplink control channel) carries uplink control information, and supports multiple formats, such as 1, 1a, 1b, 2, 2a, 2b, and 3. If PUCCH is enabled, there is at least one resource block in a frequency domain reserved for PUCCH. In a time domain, each slot has a PUCCH resource block in an FDD mode, and each uplink slot has a PUCCH RB in a TDD mode. PUCCH format 1/1a/1b resources are identified by a resource index.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, a computer program product, and a computer-readable storage medium as defined in the independent claims. Further embodiments of the invention are disclosed in the dependent claims.

An aspect of the invention relates to a method for resource allocation in a communications system, the method comprising determining, in a network apparatus, PUCCH format 1a/1b resources for HARQ-ACK for time division duplex signaling based on an index of the first enhanced control channel element used for transmission of a corresponding EPDCCH downlink assignment in an uplink subframe, the index of the downlink subframe in which the EPDCCH downlink assignment is transmitted, and one or more configured parameters.

A further aspect of the invention relates to an apparatus comprising at least one processor; and at least one memory including a computer program code, wherein the at least one memory and the computer program code are configured to, with the at least one processor, cause the apparatus to determine PUCCH format 1a/1b resources for HARQ-ACK for time division duplex signaling based on an index of the first enhanced control channel element used for transmission of a corresponding EPDCCH downlink assignment in an uplink subframe, the index of the downlink subframe in which the EPDCCH downlink assignment is transmitted, and one or more configured parameters.

A still further aspect of the invention relates to a user terminal comprising at least one processor; and at least one memory including a computer program code, wherein the at least one memory and the computer program code are configured to, with the at least one processor, cause the user terminal to apply PUCCH format 1a/1b resource mapping for EPDCCH scheduled PDSCH for time division duplex signaling based on an index of the first enhanced control channel element used for transmission of a corresponding EPDCCH downlink assignment in an uplink subframe, the index of the downlink subframe in which the EPDCCH downlink assignment is transmitted, and one or more configured parameters.

A still further aspect of the invention relates to a computer program product comprising program code means configured to perform any of the method steps when the program is run on a computer.

A still further aspect of the invention relates to a computer-readable storage medium comprising program code means configured to perform any of the method steps when executed on a computer.

BRIEF DESCRIPTION OF THE DRAWINGS

In the following the invention will be described in greater detail by means of preferred embodiments with reference to the attached drawings, in which.

DETAILED DESCRIPTION OF SOME EMBODIMENTS

Figure 1:
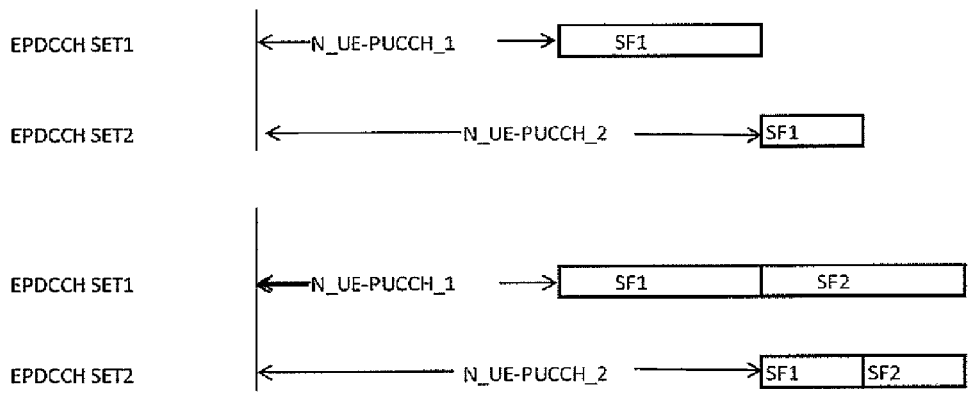
FIG. 1 illustrates a multi-SF PUCCH resource arrangement by following Rel-8/9/10.

PUCCH format 1a/1b resource allocation for HARQ-ACKs corresponding to PDSCH transport block scheduled via EPDCCH was discussed in the 3GPP RAN1#70 meeting. It was agreed that: the lowest eCCE index of the corresponding EPDCCH is a component of PUCCH resource determination; UE is configured with a semi-static PUCCH resource starting offset for each EPDCCH set (eCCE is indexed per EPDCCH set); for further study until RAN1#70bis between:

option A) not to use dynamically signaled PUCCH resource offset by EPDCCH, option B) dynamically signaled PUCCH resource offset by EPDCCH, whichever of options A and B is chosen, RRC signaling is not introduced;

FFS until RAN1#70bis for localized EPDCCH among:

option X) not to use antenna port index, option Y) to use antenna port index of EPDCCH, option Z) to use antenna port index of PDSCH;

TDD aspects are FFS—if solutions are needed, aim for solutions without RRC impact.

The lowest eCCE index of the EPDCCH DL assignment scheduling the PDSCH data is used as a resource index in implicit PUCCH resource allocation. Additionally, a semi-static resource starting offset is configurable for each EPDCCH set (configuration of an EPDCCH set is UE specific), which may be used e.g. to avoid PUCCH resource collision between EPDCCH and PDCCH as well as different EPDCCH sets.

Considering the efficiency of PUCCH resource utilization (or total PUCCH overhead in UL), the resource region for HARQ-ACK corresponding to PDSCH scheduled via PDCCH and/or different EPDCCH sets may be configured to be overlapped. To avoid collisions, a dynamic resource offset that is signaled in DL DCIs via EPDCCH (i.e. the same DCI the schedules the PDSCH) might additionally be adopted. It should be noted that this dynamic offset may be viewed as a selection among multiple resources, and each resource should be linked to the implicitly derived resource (instead of explicitly configured resource, like format 1a/1b resource for SCell in CA).

Considering the possibility of MU-MIMO on EPDCCH, an antenna port (AP) index might be included in the implicit resource mapping for localized EPDCCH.

The above discussions are mainly considering FDD, not whether additional specification support is needed for TDD. An exemplary embodiment is handling PUCCH resource allocation for HARQ-ACKs corresponding to PDSCH scheduled via EPDCCH in the case of TDD operation.

An issue in PUCCH format 1a/1b resource allocation for TDD is that more than one DL subframe may be associated with a single UL subframe. As shown in Table 1, HARQ-ACKs corresponding to M (may be 1, 2, 3, 4 (only up to four subframes need to be supported with A/N multiplexing in combination with channel selection; UL-DL configuration #5 is considered as a special case as it only supports A/N bundling)) DL subframes are reported in one UL subframe. That means that if nothing is specified beyond RAN1#70 agreements, PUCCH resources corresponding to M DL subframes collide.

TABLE 1

Downlink association set index K: K: $\{k_0, k_1, \ldots k_{M-1}\}$ for TDD

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The dynamic resource offset may be used to avoid such a collision, but it has not been decided whether it is to be adopted; and even if so, it may not be sufficient to further handle the resource collision between multiple DL subframes (on top of the collisions between PUCCH format 1a/b resources corresponding to PDCCH and different EPDCCH sets corresponding to different UEs).

To summarize, the arrangement of PUCCH resources corresponding to multiple DL subframes (multi-SF PUCCH resource arrangement) involves a problem. Specifically, if a separate PUCCH resource region is reserved for HARQ-ACKs corresponding to each DL subframe, a question is, how to define the semi-static resource starting offset for each EPDCCH set, and, if resources regions for different DL subframes may be overlapped, how to further solve the PUCCH resource collision between HARQ-ACKs corresponding to multiple DL subframes.

In existing solutions, for PDCCH in Rel-8/9/10 TDD operation, PUCCH resources corresponding to multiple DL subframes are concatenated and interleaved in the associated UL subframe (e.g. with 40 CCEs per DL subframe and M=2, 80 PUCCH resources are reserved), so that there is no resource collision between different subframes. To be specific, the PDCCH resources corresponding to PDCCH OFDM symbols [s1, s2, s3, . . . ] and subframes [SF1, SF2, SF3, . . . ] are mapped to PUCCH in the following order:

SF1-s1
SF2-s1
SF3-s1
. . .
SF1-s2
SF2-s2
SF3-s2
. . .

The downside of this arrangement is that the UL overhead is also maximized as the PUCCH regions corresponding to different DL subframes and PDCCH OFDM-symbols are fully non-overlapping.

However, directly re-using of Rel-8/9/10 principle is not a favourable solution because the PDCCH and corresponding PUCCH resource region is common to each UE in the cell, but the EPDCCH set and corresponding PUCCH region is UE-specific. Hence, concatenation of PUCCH resource regions corresponding to different DL subframes is not able to guarantee a collision free operation. Alternatively, if the offset parameter for Set 2 is configured to be large enough to avoid collisions when M>1, there would be excessive PUCCH resource overhead due to resource fragmentation.

FIG. 1 illustrates a N_UE-PUCCH configuration assuming M=1, and directly re-using of Rel-8/9/10 principle, wherein two EPDCCH sets (Set 1 and Set 2) are configured. FIG. 1 is an illustration of multi-SF PUCCH resource arrangement by simply following Rel-8/9/10. The PUCCH resources for two EPDCCH sets overlap/collide in case the HARQ-ACKs from multiple subframes map into a single UL subframe. FIG. 1 may be considered to correspond to TDD UL-DL configuration 1 (see Table 1), wherein from a HARQ-ACK signaling point of view, some of the UL subframes (#3 & #8) are associated with a single DL subframe (as in the upper part of FIG. 1), whereas some other UL subframes (#2, #7) are associated with two DL subframes (the lower part of FIG. 1). The semi-static offsets for Set 1 and Set 2 are N_UE-PUCCH_1, and N_UE-PUCCH_2, respectively. With the configuration as in the FIG. 1, this leads to having completely separate PUCCH regions for Set 1 and Set 2 in the upper part of FIG. 1. With simply placing resource for SF2 after resource for SF1 for each EPDCCH set, there is a collision between {set1, SF2}, {set2, SF1} and {set2, SF2} as in the lower part of FIG. 1. This means that collision avoidance by semi-static offset is only valid for the first DL subframe. It is also noted that even with dynamic offset, it is difficult for a practical scheduler to handle collisions in case overlapping resources relate to different subframes (for example, FIG. 1).

In the case of FDD, the PUCCH format 1a/1b HARQ-ACK resource in response to EPDCCH scheduled PDSCH may be described with the following formula (RAN1#70 agreement):

$$n_{PUCCH}^{(1)} = n_{eCCE} + N_{UE\text{-}PUCCH}^{(1)} + k,$$

where $n_{PUCCH}^{(1)}$ is the PUCCH format 1a/b resource for the HARQ-ACK, $n_{eCCE}$ is the index of the lowest eCCE of the detected EPDCCH carrying the DL assignment, $N_{UE\text{-}PUCCH}^{(1)}$ is UE- and EPDCCH-set-specific PUCCH resources offset configured by higher layers (via a protocol layer higher than the physical layer), and k is a dynamic offset modifier such as an antenna port-specific offset associated with antenna port p, where p is the antenna port allocated to the first CCE of corresponding EPDCCH or other explicitly signaled or implicitly derived parameter. It should be noted that according to the decisions in RAN1#70, it has not yet been confirmed whether k is needed or not.

An exemplary embodiment relates to PUCCH format 1a/1b resource allocation for EPDCCH in TDD. An exemplary embodiment is handling the multi-SF PUCCH resource arrangement format 1a/1b resource allocation for EPDCCH in TDD. The definition of semi-static offset for each EPDCCH set is extended by considering multiple DL subframes, and dynamic offset mechanism is enhanced to solve the resource collision between multiple DL subframes.

In an exemplary embodiment, regarding extended definition of semi-static resource starting offset for each EPDCCH set, resource collisions may be avoided by providing a mechanism to adjust the implicit resource allocation so that it adapts to the number of DL subframes mapping to a single UL subframe. EPDCCH scheduling restrictions may be minimized by allowing for a possibility of having fully orthogonal PUCCH format 1a/b resources for a given UE and/or EPDCCH set.

In an exemplary embodiment, a single semi-static UE-specific resource starting offset $N_{UE\text{-}PUCCH}^{(1)}$ may be configured for each EPDCCH set assuming M=1. Additionally, for the case of TDD, another parameter, $N_{UE\text{-}PUCCH\text{-}TDD}^{(1)}$ may be introduced impacting the resource allocation formula when M>1, i.e. when PUCCH HARQ-ACK resources for multiple DL subframes map into a single UL subframe.

In an exemplary embodiment, when M>1, the offset applied in each DL subframe is dependent on $N_{UE\text{-}PUCCH}^{(1)}$, $N_{UE\text{-}PUCCH\text{-}TDD}^{(1)}$ and m, where m (0 ... M−1) is the relative index of the DL subframe. Compared with the prior art FDD formula, this means that an additional TDD-specific adjustment based on $N_{UE\text{-}PUCCH\text{-}TDD}^{(1)}$ is applied. This allows for avoiding the problem depicted in FIG. 1, by fully separating the PUCCH resources related to EPDCCH Set1 and Set2, as in FIG. 2, FIG. 2 being an illustration of a multi-SF PUCCH resource arrangement with a fully orthogonal PUCCH region.

In an exemplary embodiment, regarding enhancement of dynamic offset mechanism to solve multi-SF resource collision, besides the semi-static offset, it is proposed to apply an alternative/complementary dynamic offset modifier k for TDD on top of semi-static (+subframe specific) offset parameters. A starting point is to apply dynamic offset modifier which does not depend on the parameter m. In other words, dynamic offset modifier (if available) is derived from the content downlink control information which EPDCCH is carrying.

In an exemplary embodiment, it may also be possible to define an enhanced version of dynamic offset which depends on the subframe index m. In that case multiple (typically M) sets of dynamic offset modifiers may be specified or configured, and the subframe index m may be used as one factor to determine the value of the dynamic offset modifier k (Res_i, m), where Res_i is the resource index signaled in DL DCI via EPDCCH.

An exemplary embodiment of dynamic offset is where k (Res_i, m) is defined to be C(m) with m≥1. For example, when a predefined condition such as when m=1, the index of the A/N resource corresponding to the 2nd subframe is derived from the resource index of the first subframe $X_{m=0}$ as $(X_{m=0})+C$, where C is a predefined number (e.g. 1 or 3). In more generic terms, there may be a matrix C with (M−1) columns and n rows (n corresponds to number of options behind the dynamic switching). The matrix C may be configured via higher layers (via a protocol layer higher than the physical layer).

Figure 2:
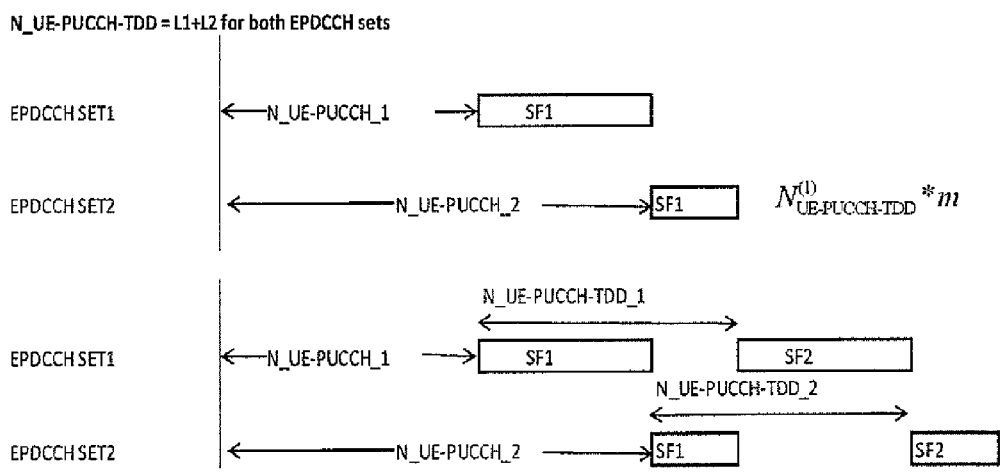
FIG. 2 illustrates an exemplary multi-SF PUCCH resource arrangement with a fully orthogonal PUCCH region.

In an exemplary embodiment, the resource allocation formula for TDD may be described using the notation from a 3GPP specification as:

$$n_{PUCCH}^{(1)} = N_{UE\text{-}PUCCH\text{-}TDD}^{(1)} * m + n_{eCCE} + N_{UE\text{-}PUCCH}^{(1)} + k,$$

where $N_{UE\text{-}PUCCH\text{-}TDD}^{(1)}$ is a parameter specific for a TDD operation. $N_{UE\text{-}PUCCH\text{-}TDD}^{(1)}$ may be configured semi-statically and signaled via RRC signaling, or it may be e.g. equal to or a multiple of the number eCCEs in the given EPDCCH set. A resulting PUCCH resource arrangement is shown in FIG. 2. $n_{eCCE}$ is the number of the first eCCE used for transmission of the corresponding EPDCCH in subframe n−$k_m$. UE selects the corresponding m, where m(0 ... M−1) is the relative index of the DL subframe of PDSCH scheduled by EPDCCH derived from Table 1. k is a dynamic offset modifier such as an antenna port-specific offset associated with antenna port p, where p is the antenna port allocated to the first eCCE of a corresponding EPDCCH or other explicitly signaled or implicitly derived parameter.

Regarding the values for the parameters, in order to achieve the PUCCH resource arrangement in FIG. 2, the parameter $N_{UE\text{-}PUCCH\text{-}TDD}^{(1)}$ may be set as (number of PUCCH resources corresponding to EPDCCH Set 1+number of PUCCH resources corresponding to EPDCCH Set 2), or equivalently as (# of eCCEs in EPDCCH Set 1+# of eCCEs in EPDCCH Set 2). It should be noted that eNB may configure another value for $N_{UE\text{-}PUCCH\text{-}TDD}^{(1)}$ to flexibly control the multi-SF PUCCH resource arrangement.

Figure 3:
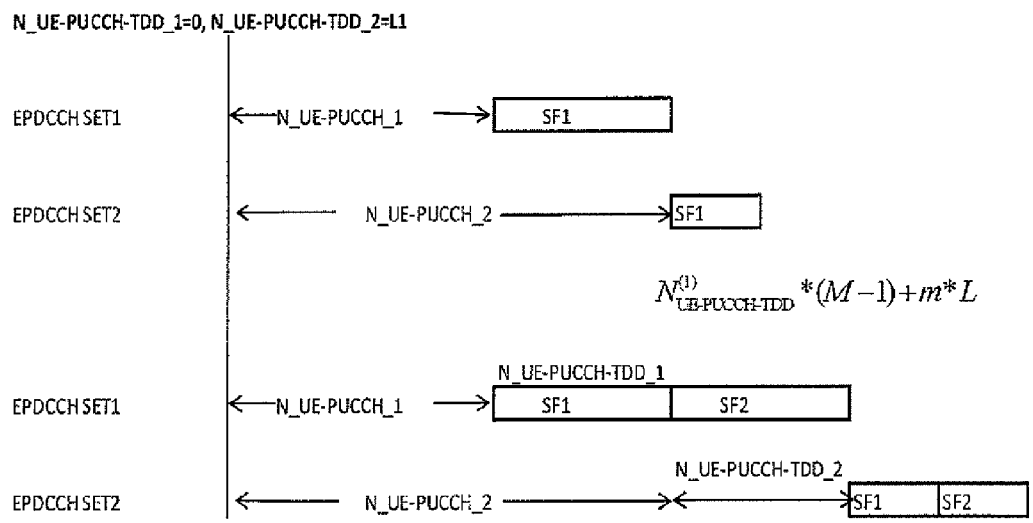
FIG. 3 illustrates another exemplary multi-SF PUCCH resource arrangement with a fully orthogonal PUCCH region.

It should also be noted that $N_{UE\text{-}PUCCH\text{-}TDD}^{(1)} * m$ may be considered as a specific form of the additional TDD-specific adjustment based on $N_{UE\text{-}PUCCH\text{-}TDD}^{(1)}$. An example may be $N_{UE\text{-}PUCCH\text{-}TDD}^{(1)} * (M-1) + m * L$ which leads to a PUCCH resource arrangement shown in FIG. 3, FIG. 3 being an illustration of another multi-SF PUCCH resource arrangement with fully orthogonal PUCCH region, where L is the number of PUCCH resources in the corresponding EPDCCH set. Another possibility is that multiple (typically M) $N_{UE\text{-}PUCCH\text{-}TDD}^{(1)}$ parameters may be configured for an EPDCCH set, one for each DL subframe.

Interleaving among resources corresponding to multiple DL subframes may also be possible.

In an exemplary embodiment, an extended definition of semi-static resource starting offset for each EPDCCH set enables a full PUCCH resource separation between different DL subframes; in particular, the subframe-specific configuration enables providing a very flexible support.

An exemplary embodiment enables maximizing the similarity between FDD and TDD modes. If M=1 ($N_{UE\text{-}PUCCH\text{-}TDD}^{(1)}$ is not in use), then the resource allocation corresponds to that of an FDD solution.

An exemplary embodiment allows to trade-off the scheduler flexibility and PUCCH resource consumption. With a minimum overhead, PUCCH resources corresponding to different subframes may be made fully overlapping ($N_{UE\text{-}PUCCH\text{-}TDD}^{(1)}=0$). With maximum overhead, PUCCH resources corresponding to different subframes may be made fully orthogonal.

An exemplary embodiment allows making subframe alignment for the PUCCH resources corresponding to different EPDCCH sets. This simplifies the scheduler implementation, since there are no collisions among different subframes.

Enhancement of dynamic offset mechanism enables providing additional flexibility to solve a multi-SF resource collision in cases where PUCCH resource regions corresponding to different DL subframes are overlapped.

Exemplary embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support PUCCH resource allocation for HARQ-ACK corresponding to PDSCH scheduled via EPDCCH. Other use cases related to EPDCCH may be considered as well, e.g. signaling related to semi-persistent scheduling. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE (or LTE-A) (long term evolution (advanced long term evolution)) network elements, without restricting the embodiment to such an architecture, however. The embodiments described in these examples are not limited to the LTE radio systems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

Figure 4:
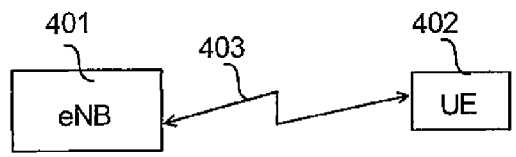
FIG. 4 shows a simplified block diagram illustrating exemplary system architecture.

A general architecture of a communication system is illustrated in FIG. 4. FIG. 4 is a simplified system architecture only showing some elements and functional entities, all being logical units whose implementation may differ from what is shown. The connections shown in FIG. 4 are logical connections; the actual physical connections may be different. It is apparent to a person skilled in the art that the systems also comprise other functions and structures. It should be appreciated that the functions, structures, elements and the protocols used in or for PUCCH resource allocation, are irrelevant to the actual invention. Therefore, they need not to be discussed in more detail here.

The exemplary radio system of FIG. 4 comprises a network node 401 of a network operator. The network node 401 may include e.g. an LTE base station (eNB), radio network controller (RNC), or any other network element, or a combination of network elements. The network node 401 may be connected to one or more core network (CN) elements (not shown in FIG. 4) such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR). In FIG. 4, the radio network node 401 that may also be called eNB (enhanced node-B, evolved node-B) or network apparatus of the radio system, hosts the functions for radio resource management in a public land mobile network. FIG. 4 shows one or more user equipment 402 located in the service area of the radio network node 401. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 4, the user equipment 402 is capable of connecting to the radio network node 401 via a connection 403.

Figure 5:
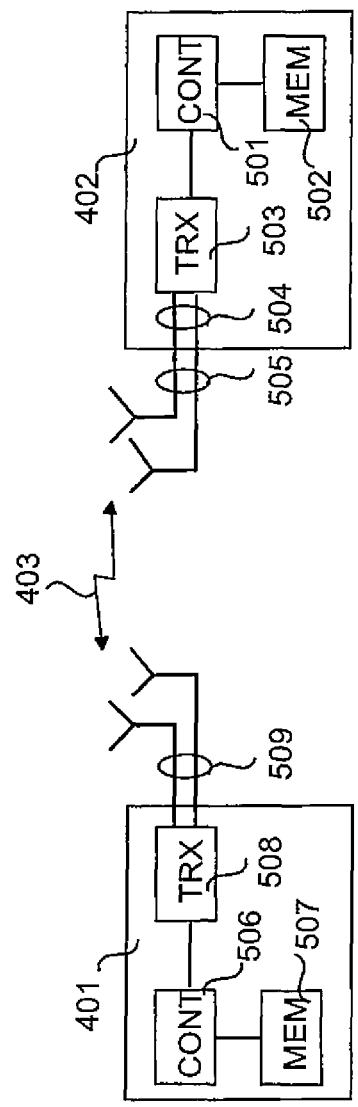
FIG. 5 shows a simplified block diagram illustrating exemplary apparatuses.

FIG. 5 is a block diagram of an apparatus according to an embodiment of the invention. FIG. 5 shows a user equipment 402 located in the area of a radio network node 401. The user equipment 402 is configured to be in connection with the radio network node 401. The user equipment or UE 402 comprises a controller 501 operationally connected to a memory 502 and a transceiver 503. The controller 501 controls the operation of the user equipment 402. The memory 502 is configured to store software and data. The transceiver 503 is configured to set up and maintain a wireless connection 403 to the radio network node 401. The transceiver 503 is operationally connected to a set of antenna ports 504 connected to an antenna arrangement 505. The antenna arrangement 505 may comprise a set of antennas. The number of antennas may be one to four, for example. The number of antennas is not limited to any particular number. The user equipment 402 may also comprise various other components, such as a user interface, camera, and media player. They are not displayed in the figure due to simplicity. The radio network node 401, such as an LTE base station (eNode-B, eNB) comprises a controller 506 operationally connected to a memory 507, and a transceiver 508. The controller 506 controls the operation of the radio network node 401. The memory 507 is configured to store software and data. The transceiver 508 is configured to set up and maintain a wireless connection to the user equipment 402 within the service area of the radio network node 401. The transceiver 508 is operationally connected to an antenna arrangement 509. The antenna arrangement 509 may comprise a set of antennas. The number of antennas may be two to four, for example. The number of antennas is not limited to any particular number. The radio network node 401 may be operationally connected (directly or indirectly) to another network element (not shown in FIG. 6) of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 401, 402 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 401, 402 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 502, 507 may include volatile and/or nonvolatile memory and typically stores content, data, or the like. For example, the memory 502, 507 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein.

The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 6:
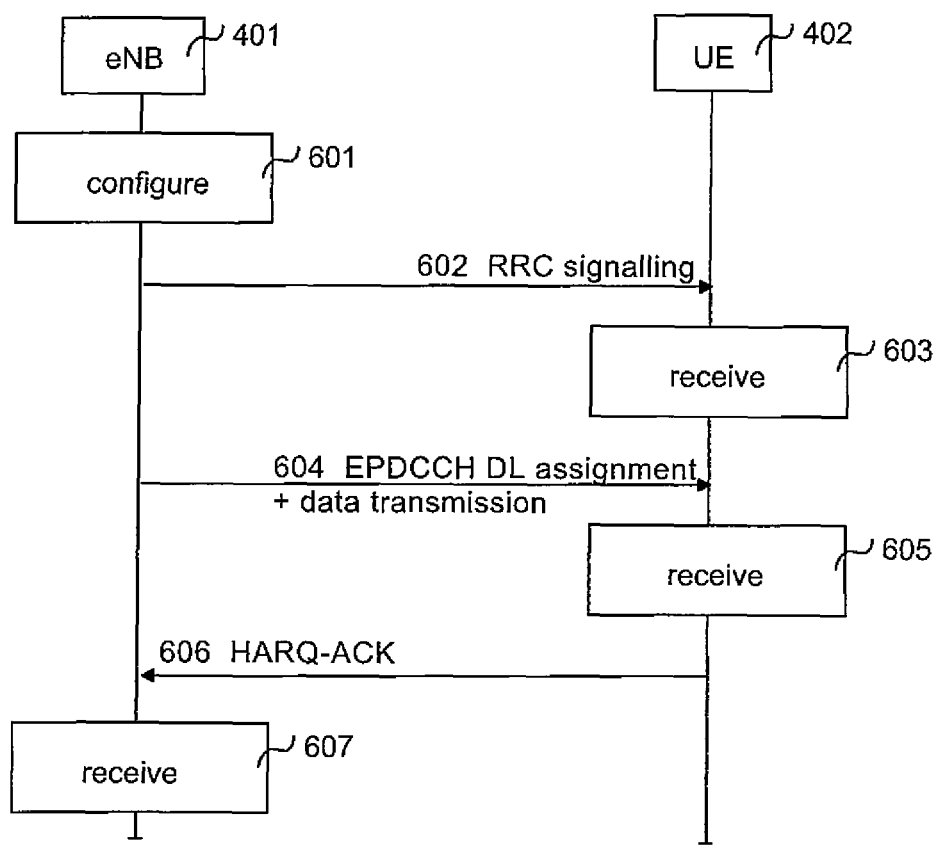
FIG. 6 shows a signaling diagram illustrating an exemplary messaging event according to an embodiment of the invention.

The signaling chart of FIG. 6 illustrates the required signaling. In the example of FIG. 6, a network node 401 (which may comprise e.g. a LTE-capable base station (eNode-B, eNB)) may transmit a configuration signal 602 to a user terminal 402 (UE), for configuring UE 402 to transmit a HARQ-ACK signal 606 by utilizing a PUCCH format 1a/b resource for EPDCCH signaling in TDD. This signaling 602 may be e.g. dedicated higher layer (i.e. higher than L1) signaling (e.g. RRC signaling). Before transmitting the signaling 602, eNB 401 may configure the resources in item 601. In item 603, UE 402 may receive the configuration signal 602. In item 604, a EPDCCH DL assignment and data is transmitted from eNB 401 to UE 402. In item 605, UE 402 receives the EPDCCH DL assignment which schedules DL data, wherein UE 402 detects EPDCCH eCCE and uses the index of the first eCCE in determining the HARQ-ACK resource. In step 605, UE 402 applies the resource allocation formula based on the configured parameters and the eCCE index. The formula gives as an output an UL (PUCCH) resource by which the HARQ-ACK 606 is transmitted from UE 402 to eNB 401. In item 606, UE 402 may transmit the HARQ-ACK signal 606 by utilizing the determined PUCCH format 1a/b resource for EPDCCH signaling in TDD. In item 607, eNB 401 may receive the HARQ-ACK signaling 606 from UE 402.

Figure 7:
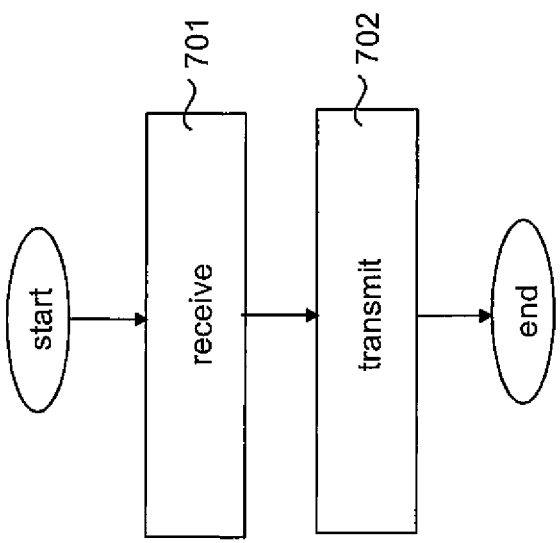
FIG. 7 shows a schematic diagram of a flow chart according to an exemplary embodiment of the invention.

FIG. 7 is a flow chart illustrating an exemplary embodiment. The apparatus 402, which may comprise e.g. a network element (network node, e.g. a user terminal, UE) receives, in item 701, from a network apparatus 401 (which may comprise e.g. a LTE base station eNB 401) a configuration signal for configuring UE 402 to transmit a HARQ-ACK signal by utilizing a PUCCH format 1a/b resource for EPDCCH signaling in TDD. The received con-figuration signaling may be e.g. dedicated higher layer signaling, e.g. RRC signaling. In item 702, UE 402 transmits a HARQ-ACK signal to eNB 401 by utilizing the configured PUCCH format 1a/b resource for EPDCCH signaling in TDD.

Figure 8:
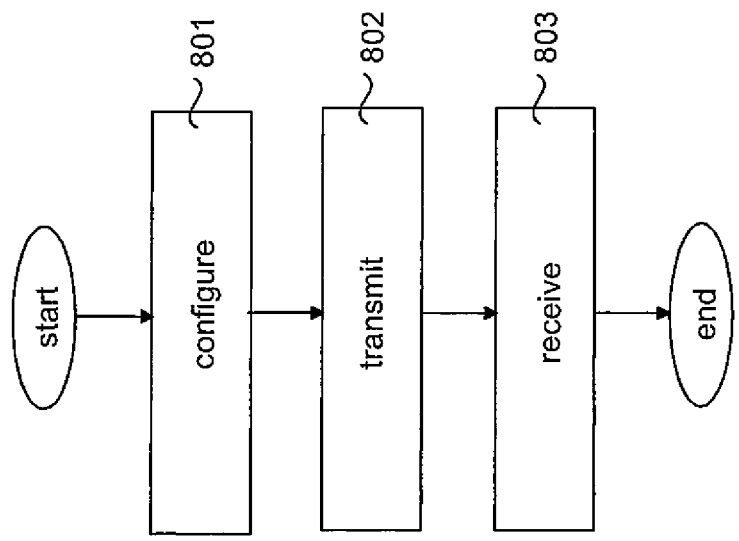
FIG. 8 shows a schematic diagram of a flow chart according to an exemplary embodiment of the invention.

FIG. 8 is a flow chart illustrating an exemplary embodiment. The apparatus 401, which may comprise e.g. a network element (network node 401, e.g. a LTE base station, eNB) transmits, in item 802, to another network element (network node 402, e.g. a user terminal, UE) a configuration signal for configuring UE 402 to transmit a HARQ-ACK signal by utilizing a PUCCH format 1a/b resource for EPDCCH signaling in TDD. The configuration signaling transmitted in item 802 may be e.g. dedicated higher layer signaling. Before transmitting the signaling in item 802, eNB 401 may configure the resources in item 801. In item 803, eNB 401 may receive the HARQ-ACK signaling transmitted from UE 401 by utilizing the configured PUCCH format 1a/b resource for EPDCCH signaling in TDD.

The steps/points, signaling messages and related functions described above in FIGS. 1 to 8 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signaling messages are only exemplary and may even comprise several separate messages for transmitting the same information. In addition, the messages may also contain other information.

Thus, according to an exemplary embodiment, there is provided a method for resource allocation in a communications system, comprising determining, in a network apparatus, PUCCH format 1a/1b resources for HARQ-ACK for time division duplex signaling based on an index of the first enhanced control channel element used for transmission of a corresponding EPDCCH downlink assignment in an uplink subframe, the index of the downlink subframe in which the EPDCCH downlink assignment is transmitted, and one or more configured parameters.

According to another exemplary embodiment, the one or more configured parameters comprising one or more of a first semi-static user terminal-specific resource starting offset defined for an EPDCCH set, a second user terminal-specific resource offset defined for each EPDCCH set, a dynamic offset modifier.

According to yet another exemplary embodiment, a multi-subframe PUCCH format 1a/1b resource allocation is carried out for HARQ-ACK corresponding to PDSCH scheduled via EPDCCH.

According to yet another exemplary embodiment, when M=1, the resource determination is independent of the second user terminal-specific resource offset.

According to yet another exemplary embodiment, for time division duplex signaling when M>1, the second user terminal-specific resource offset impacts resource allocation when PUCCH HARQ-ACK resources for multiple downlink subframes map into a single uplink subframe.

According to yet another exemplary embodiment, the offset for each EPDCCH set applied in each downlink subframe is dependent on the first semi-static user terminal-specific resource starting offset, the second user terminal-specific resource offset, and m, where m(0 . . . M−1) is a relative index of the downlink subframe, M being the number of downlink subframes associated with an uplink subframe for HARQ-ACK feedback.

According to yet another exemplary embodiment, the dynamic offset modifier is dependent on an antenna port or a power control command.

According to yet another exemplary embodiment, the dynamic offset modifier is applied such that it is independent on a subframe index m, wherein the dynamic offset modifier is derived based on downlink control information DCI that EPDCCH is carrying.

According to yet another exemplary embodiment, the dynamic offset modifier is applied such that the dynamic offset modifier depends on a subframe index m, wherein multiple sets of dynamic offset modifiers are defined to be a matrix C with (M−1) columns and N rows, N corresponding to the number of options to perform dynamic switching, M being the number of downlink subframes associated with an uplink subframe for HARQ-ACK feedback, and the subframe index m is used as one factor to determine the value of the dynamic offset modifier k(n, m), where n is an index of dynamic switching option signaled as downlink control information DCI via EPDCCH.

According to yet another exemplary embodiment, the resource index of the ACK/NACK resource corresponding to the m-th subframe $X_m$ is derived from the resource index of the first subframe $X_0$ as $X_0+C(m)$, where $C(m)$ is a predefined constant number.

According to yet another exemplary embodiment, the matrix C is configured via a protocol layer higher than the physical layer.

According to yet another exemplary embodiment, the dynamic offset modifier k is an antenna port-specific offset associated with antenna port p, where p is the antenna port allocated to the first control channel element CCE of corresponding EPDCCH or other explicitly signaled or implicitly derived parameter.

According to yet another exemplary embodiment, the method comprises scheduling the PUCCH format 1a/1b resources for EPDCCH for time division duplex signaling based on formula I:

$$n_{PUCCH}^{(1)} = N_{UE\text{-}PUCCH\text{-}TDD}^{(1)} * m + n_{eCCE} + N_{UE\text{-}PUCCH}^{(1)} + k, \qquad (I)$$

where $n_{PUCCH}^{(1)}$ is a PUCCH format 1a/1b resource to be allocated for a HARQ-ACK signal; $N_{UE\text{-}PUCCH}^{(1)}$ is the first semi-static user terminal-specific resource starting offset defined for an EPDCCH set; $N_{UE\text{-}PUCCH\text{-}TDD}^{(1)}$ is the second user terminal-specific resource offset defined for EPDCCH sets when M>1, M being the number of downlink subframes associated with an uplink subframe for HARQ-ACK feedback, m being a relative index of a downlink subframe, wherein 0≤m≤M−1; $n_{eCCE}$ is an index of the first enhanced control channel element eCCE used for transmission of a corresponding EPDCCH downlink assignment in a downlink subframe n−$k_m$, where m is the relative index of the downlink subframes and 0≤m≤M−1; k is the dynamic offset modifier.

According to yet another exemplary embodiment, there is provided an apparatus comprising at least one processor; and at least one memory including a computer program code, wherein the at least one memory and the computer program code are configured to, with the at least one processor, cause the apparatus to determine PUCCH format 1a/1b resources for HARQ-ACK for time division duplex signaling based on an index of the first enhanced control channel element used for transmission of a corresponding EPDCCH downlink assignment in an uplink subframe, the index of the downlink subframe in which the EPDCCH downlink assignment is transmitted, and one or more configured parameters.

According to yet another exemplary embodiment, the at least one memory and the computer program code are configured to, with the at least one processor, cause the apparatus to carry out a multi-subframe PUCCH format 1a/1b resource allocation for HARQ-ACK corresponding to PDSCH scheduled via EPDCCH.

According to yet another exemplary embodiment, the at least one memory and the computer program code are configured to, with the at least one processor, cause the apparatus to apply the dynamic offset modifier k dependent on an antenna port or a power control command.

According to yet another exemplary embodiment, the at least one memory and the computer program code are configured to, with the at least one processor, cause the apparatus to apply the dynamic offset modifier such that it is independent on a subframe index m, wherein the dynamic offset modifier is derived based on downlink control information DCI that EPDCCH is carrying.

According to yet another exemplary embodiment, the at least one memory and the computer program code are configured to, with the at least one processor, cause the apparatus to apply the dynamic offset modifier such that the dynamic offset modifier depends on a subframe index m, wherein multiple sets of dynamic offset modifiers are defined to be a matrix C with (M−1) columns and N rows, N corresponding to the number of options to perform dynamic switching, M being the number of downlink subframes associated with an uplink subframe for HARQ-ACK feedback, and the subframe index m is used as one factor to determine the value of the dynamic offset modifier k(n, m), where n is an index of dynamic switching option.

According to yet another exemplary embodiment, the at least one memory and the computer program code are configured to, with the at least one processor, cause the apparatus to define the matrix C via a protocol layer higher than the physical layer.

According to yet another exemplary embodiment, the at least one memory and the computer program code are configured to, with the at least one processor, cause the apparatus to set the second user terminal-specific resource offset as the number of PUCCH resources corresponding to a first EPDCCH set+the number of PUCCH resources corresponding to a second EPDCCH set; or the number of eCCEs in the first EPDCCH set+the number of eCCEs in the second EPDCCH set.

According to yet another exemplary embodiment, the at least one memory and the computer program code are configured to, with the at least one processor, cause the apparatus to schedule the PUCCH format 1a/1b resources for EPDCCH for time division duplex signaling based on formula I:

$$n_{PUCCH}^{(1)} = N_{UE\text{-}PUCCH\text{-}TDD}^{(1)} * m + n_{eCCE} + N_{UE\text{-}PUCCH}^{(1)} + k, \quad (II)$$

where $n_{PUCCH}^{(1)}$ is a PUCCH format 1a/1b resource to be allocated for a HARQ-ACK signal; $N_{UE\text{-}PUCCH}^{(1)}$ is the first semi-static user terminal-specific resource starting offset defined for an EPDCCH set; $N_{UE\text{-}PUCCH\text{-}TDD}^{(1)}$ is the second user terminal-specific resource offset defined for EPDCCH sets when M>1, M being the number of downlink subframes associated with an uplink subframe for HARQ-ACK feedback, m being a relative index of a downlink subframe, wherein 0≤m≤M−1; $n_{eCCE}$ is an index of the first enhanced control channel element eCCE used for transmission of a corresponding EPDCCH downlink assignment in a downlink subframe n−$k_m$, where m is the relative index of the downlink subframes and 0≤m≤M−1; k is a dynamic offset modifier.

According to yet another exemplary embodiment, there is provided a user terminal comprising at least one processor; and at least one memory including a computer program code, wherein the at least one memory and the computer program code are configured to, with the at least one processor, cause the user terminal to apply PUCCH format 1a/1b resource mapping for EPDCCH scheduled PDSCH for time division duplex signaling based on an index of the first enhanced control channel element used for transmission of a corresponding EPDCCH downlink assignment in an uplink subframe, the index of the downlink subframe in which the EPDCCH downlink assignment is transmitted, and one or more configured parameters.

According to yet another exemplary embodiment, there is provided a computer program product comprising program code means configured to perform any of the method steps when the program is run on a computer.

According to yet another exemplary embodiment, there is provided a computer-readable storage medium comprising program code means configured to perform any of the method steps when executed on a computer.

LIST OF ABBREVIATIONS

A/N acknowledgement (ACK)/negative ACK
EPDCCH enhanced physical downlink control channel
PUCCH physical uplink control channel
PDCCH physical downlink control channel
AP antenna port
DCI downlink control information
SF subframe
eCCE enhanced control channel element
TDD time division duplex
HARQ hybrid automatic repeat request
PDSCH physical downlink shared channel
3GPP 3$^{rd}$ generation partnership project
RAN radio access network
RRC radio resource control
DL downlink
UL uplink
MU-MIMO multi user multiple input multiple output
CA carrier aggregation
FDD frequency division duplex
UE user equipment
OFDM orthogonal frequency division multiplexing
Rel release
CCE control channel element

The invention claimed is:

1. A method for resource allocation in a communications system, characterized by
   determining, in a network apparatus, PUCCH format 1a/1b resources for HARQ-ACK for time division duplex signalling based on
   an index of the first enhanced control channel element used for transmission of a corresponding EPDCCH downlink assignment in a downlink subframe,
   the index of the downlink subframe in which the EPDCCH downlink assignment is transmitted, and
   one or more configured parameters,
   wherein the one or more configured parameters comprise
   a dynamic offset modifier,
   a first semi-static user terminal-specific resource starting offset defined for an EPDCCH set, and
   a second user terminal-specific resource offset defined for each EPDCCH set.

2. A method as claimed in claim 1, characterized in that a multi-subframe PUCCH format 1a/1b resource allocation is carried out for HARQ-ACK corresponding to PDSCH scheduled via EPDCCH.

3. A method as claimed in claim 1, characterized in that when M=1, the resource determination is independent of the second user terminal-specific resource offset, M being the number of downlink subframes associated with an uplink subframe for HARQ-ACK feedback.

4. A method as claimed in claim 1, characterized in that for time division duplex signalling when M>1, the second user terminal-specific resource offset impacts resource allocation when PUCCH HARQ-ACK resources for multiple downlink subframes map into a single uplink subframe, M being the number of downlink subframes associated with an uplink subframe for HARQ-ACK feedback.

5. A method as claimed in claim 1, characterized in that the offset for each EPDCCH set applied in each downlink subframe is dependent on the first semi-static user terminal-specific resource starting offset, second user terminal-specific resource offset, and m, where m(0 . . . M−1) is a relative index of the downlink subframe, M being the number of downlink subframes associated with an uplink subframe for HARQ-ACK feedback.

6. A method as claimed in claim 1, characterized in that the dynamic offset modifier k is dependent on an antenna port or a power control command.

7. A method as claimed in claim 1, characterized in that the dynamic offset modifier is applied such that it is independent on a subframe index m, wherein the dynamic offset modifier is derived based on downlink control information DCI that EPDCCH is carrying.

8. A method as claimed in claim 1, characterized in that a dynamic offset modifier is applied such that the dynamic offset modifier depends on a subframe index m, wherein multiple sets of dynamic offset modifiers are defined to be a matrix C with (M−1) columns and N rows, N corresponding to the number of options to perform dynamic switching, M being the number of downlink subframes associated with an uplink subframe for HARQ-ACK feedback, and the subframe index m is used as one factor to determine the value of the dynamic offset modifier k(n, m), where n is an index of dynamic switching option signalled as downlink control information DCI via EPDCCH.

9. A method as claimed in claim 8, characterized in that the resource index of the ACK/NACK resource corresponding to the m-th subframe $X_m$ is derived from the resource index of the first subframe $X_0$ as $X_0+C(m)$, where C(m) is a predefined constant number.

10. A method as claimed in claim 9, characterized in that the matrix C is configured via a protocol layer higher than the physical layer.

11. A method as claimed in claim 1, characterized in that the dynamic offset modifier k is an antenna port-specific offset associated with antenna port p, where p is the antenna port allocated to the first control channel element CCE of corresponding EPDCCH or other explicitly signalled or implicitly derived parameter.

12. A method as claimed in claim 1, characterized by scheduling the PUCCH format 1a/1b resources for EPDCCH for time division duplex signalling based on formula I:

$$n_{PUCCH}^{(1)} = N_{UE\text{-}PUCCH\text{-}TDD}^{(1)} * m + n_{eCCE} + N_{UE\text{-}PUCCH}^{(1)} + k,$$

where
$n_{PUCCH}^{(1)}$ is a PUCCH format 1a/1b resource to be allocated for a HARQ-ACK signal;
$N_{UE\text{-}PUCCH}^{(1)}$ is the first semi-static user terminal-specific resource starting offset defined for an EPDCCH set;
$N_{UE\text{-}PUCCH\text{-}TDD}^{(1)}$ is the second user terminal-specific resource offset defined for EPDCCH sets when M>1, M being the number of downlink subframes associated with an uplink subframe for HARQ-ACK feedback, m being a relative index of a downlink subframe, wherein 0≤m≤M−1;
$n_{eCCE}$ is an index of the first enhanced control channel element eCCE used for transmission of a corresponding EPDCCH downlink assignment in a downlink subframe n−$k_m$, where m is the relative index of the downlink subframes and 0≤m≤M−1;
k is a dynamic offset modifier.

13. A computer program product comprising a non-transitory computer-readable storage medium bearing computer program code embodied therein for use with a computer, the computer program code comprising code for performing the method according to claim 1.

14. An apparatus comprising:
at least one processor; and
at least one memory including a computer program code, the at least one memory and the computer program code configured, with the at least one processor, to cause the apparatus to perform the following:
determine PUCCH format 1a/1b resources for HARQ-ACK for time division duplex signalling based on
an index of the first enhanced control channel element used for transmission of a corresponding EPDCCH downlink assignment in a downlink subframe,
the index of the downlink subframe in which the EPDCCH downlink assignment is transmitted, and
one or more configured parameters,
wherein the one or more configured parameters comprise a dynamic offset modifier,
a first semi-static user terminal-specific resource starting offset defined for an EPDCCH set, and
a second user terminal-specific resource offset defined for each EPDCCH set.

15. An apparatus as claimed in claim 14, characterized in that the at least one memory and the computer program code are configured to, with the at least one processor, cause the apparatus to carry out a multi-subframe PUCCH format 1a/1b resource allocation for HARQ-ACK corresponding to PDSCH scheduled via EPDCCH.

16. An apparatus as claimed in claim 14, characterized in that when M=1, the resource determination is independent of the second user terminal-specific resource offset, M being the number of downlink subframes associated with an uplink subframe for HARQ-ACK feedback.

17. An apparatus as claimed in claim 14, characterized in that for time division duplex signalling when M>1, the second user terminal-specific resource offset impacts resource allocation when PUCCH HARQ-ACK resources for multiple downlink subframes map into a single uplink subframe, M being the number of downlink subframes associated with an uplink subframe for HARQ-ACK feedback.

18. An apparatus as claimed in claim 14, characterized in that the offset for each EPDCCH set applied in each downlink subframe is dependent on the first semi-static user terminal-specific resource starting offset, second user terminal-specific resource offset, and m, where m(0 . . . M−1) is a relative index of the downlink subframe, M being the number of downlink subframes associated with an uplink subframe for HARQ-ACK feedback.

19. An apparatus as claimed in claim 14, characterized in that the at least one memory and the computer program code are configured to, with the at least one processor, cause the apparatus to apply the dynamic offset modifier k dependent on an antenna port or a power control command.

20. An apparatus as claimed in claim 14, characterized in that the at least one memory and the computer program code are configured to, with the at least one processor, cause the apparatus to apply the dynamic offset modifier such that it is independent on a subframe index m, wherein the dynamic offset modifier is derived based on downlink control information DCI that EPDCCH is carrying.

21. An apparatus as claimed in claim 14, characterized in that the at least one memory and the computer program code are configured to, with the at least one processor, cause the apparatus to apply the dynamic offset modifier such that the dynamic offset modifier depends on a subframe index m, wherein multiple sets of dynamic offset modifiers are defined to be a matrix C with (M−1) columns and N rows, N corresponding to the number of options to perform dynamic switching, M being the number of downlink subframes associated with an uplink subframe for HARQ-ACK feedback, and the subframe index m is used as one factor to determine the value of the dynamic offset modifier k(n, m), where n is an index of dynamic switching option.

22. An apparatus as claimed in claim 21, characterized in that the resource index of the ACK/NACK resource corresponding to the m-th subframe $X_m$ is derived from the resource index of the first subframe $X_0$ as $X_0+C(m)$, where C(m) is a predefined constant number.

23. An apparatus as claimed in claim 22, characterized in that the at least one memory and the computer program code are configured to, with the at least one processor, cause the apparatus to define the matrix C via a protocol layer higher than the physical layer.

24. An apparatus as claimed in claim 14, characterized in that the dynamic offset modifier k is an antenna port-specific offset associated with antenna port p, where p is the antenna port allocated to the first control channel element CCE of corresponding EPDCCH or other explicitly signaled or implicitly derived parameter.

25. An apparatus as claimed in claim 14, characterized in that the at least one memory and the computer program code are configured to, with the at least one processor, cause the apparatus to set the parameter $N_{UE\text{-}PUCCHTDD}^{(1)}$ as the number of PUCCH resources corresponding to a first EPDCCH set+the number of PUCCH resources corresponding to a second EPDCCH set; or the number of eCCEs in the first EPDCCH set+the number of eCCEs in the second EPDCCH set.

26. An apparatus as claimed in claim 14, characterized in that the at least one memory and the computer program code are configured to, with the at least one processor, cause the apparatus to schedule the PUCCH format 1a/1b resources for EPDCCH for time division duplex signalling based on formula I:

$$n_{PUCCH}^{(1)}=N_{UE\text{-}PUCCHTDD}^{(1)}*m+n_{eCCE}+N_{UE\text{-}PUCCH}^{(1)}+k,$$

where $n_{PUCCH}^{(1)}$ is a PUCCH format 1a/1b resource to be allocated for a HARQ-ACK signal;

$N_{UE\text{-}PUCCH}^{(1)}$ is the first semi-static user terminal-specific resource starting offset defined for an EPDCCH set;

$N_{UE\text{-}PUCCHTDD}^{(1)}$ is the second user terminal-specific resource offset defined for EPDCCH sets when M>1, M being the number of downlink subframes associated with an uplink subframe for HARQ-ACK feedback, m being a relative index of a downlink subframe, wherein 0≤m≤M-1;

$n_{eCCE}$ is an index of the first enhanced control channel element eCCE used for transmission of a corresponding EPDCCH downlink assignment in a downlink subframe n-$k_m$, where m is the relative index of the downlink subframes and 0≤m≤M-1;

k is a dynamic offset modifier.

27. A user terminal comprising:
at least one processor; and
at least one memory including a computer program code, the at least one memory and the computer program code configured, with the at least one processor, to cause the user terminal to perform the following:
apply PUCCH format 1a/1b resource mapping for EPDCCH scheduled PDSCH for time division duplex signalling based on an index of the first enhanced control channel element used for transmission of a corresponding EPDCCH downlink assignment in a downlink subframe, the index of the downlink subframe in which the EPDCCH downlink assignment is transmitted, and one or more configured parameters, wherein the one or more configured parameters comprise a dynamic offset modifier, a first semi-static user terminal-specific resource starting offset defined for an EPDCCH set, and a second user terminal-specific resource offset defined for each EPDCCH set.

28. A method comprising:
receiving information on a configuration of an EPDCCH set, the configuration comprising:
a EPDCCH-set-specific PUCCH resources starting offset and at least one EPDCCH-set-specific parameter which is equal to or a multiple of the number of eCCEs in the given EPDCCH set;
determining a relative index of the DL subframe, an index of the first enhanced control channel element of the EPDCCH set carrying downlink assignment, and an index of dynamic offset modifier;
using the relative index of the DL subframe and the index of dynamic offset modifier to determine the value of the dynamic offset modifier;
determining at least one PUCCH resource based on the received information, the index of the first enhanced control channel element of the EPDCCH set carrying downlink assignment, the determined relative index of the DL subframe and the determined value of dynamic offset modifier, and
transmitting HARQ-ACK using the at least one determined PUCCH resource.

29. The method according to claim 28, further comprising applying the at least one EPDCCH-set-specific parameter downlink-subframe specifically.

30. The method according to claim 28, further comprising setting the relative index of the DL subframe 1 and deriving an index of the at least one PUCCH resource for a second subframe from a resource index of the at least one PUCCH resource of the a first subframe.

31. The method according to claim 28, further comprising setting the at least one EPDCCH-set-specific parameter zero for making subframes overlapping.

32. An apparatus comprising:
at least one processor; and
at least one memory including a computer program code, the at least one memory and the computer program code configured, with the at least one processor, to cause the apparatus to perform the following:
receive information on a configuration of an EPDCCH set, the configuration comprising:
a EPDCCH-set-specific PUCCH resources starting offset and at least one EPDCCH-set-specific parameter which is equal to or a multiple of the number of eCCEs in the given EPDCCH set;
determine a relative index of the DL subframe, an index of the first enhanced control channel element of the EPDCCH set carrying downlink assignment, and an index of dynamic offset modifier;
use the relative index of the DL subframe and the index of dynamic offset modifier to determine the value of the dynamic offset modifier;
determine at least one PUCCH resource based on the received information, the index of the first enhanced control channel element of the EPDCCH set carrying downlink assignment, the determined relative index of the DL subframe and the determined value of dynamic offset modifier, and transmit HARQ-ACK using the at least one determined PUCCH resource.

33. The apparatus as claimed in claim 32, wherein the at least one memory and the computer program code are further configured, with the at least one processor, to cause the apparatus to apply the at least one EPDCCH-set-specific parameter downlink-subframe specifically.

34. The apparatus as claimed in claim 32, wherein the at least one memory and the computer program code are further configured, with the at least one processor, to cause the apparatus to set the relative index of the DL subframe 1 and derive an index of the at least one PUCCH resource for a second subframe from a resource index of the at least one PUCCH resource of the a first subframe.

35. The apparatus as claimed in claim 32, wherein the at least one memory and the computer program code are further configured, with the at least one processor, to cause the apparatus to set the at least one EPDCCH-set-specific parameter zero for making subframes overlapping.

36. A method for resource allocation in a communications system, the method comprising:

determining, in a network apparatus, PUCCH format 1a/1b resources for HARQ-ACK for time division duplex signalling based on an index of the first enhanced control channel element used for transmission of a corresponding EPDCCH downlink assignment in a downlink subframe, a subframe index m being a relative index of the downlink subframe in which the EPDCCH downlink assignment is transmitted, and one or more configured parameters, said method characterized in that a dynamic offset modifier is one of the one or more configured parameters and wherein the dynamic offset modifier is applied such that the dynamic offset modifier depends on the subframe index m, wherein multiple sets of dynamic offset modifiers are defined to be a matrix C with (M−1) columns and N rows, N corresponding to the number of options to perform dynamic switching, M being the number of downlink subframes associated with an uplink subframe for HARQ-ACK feedback, and the subframe index m is used as one factor to determine the value of the dynamic offset modifier k(n, m), where n is an index of dynamic switching option signalled as downlink control information DCI via EPDCCH.

37. An apparatus comprising:

at least one processor; and at least one memory including a computer program code, wherein the at least one memory and the computer program code are configured, with the at least one processor, to cause the apparatus to:

determine PUCCH format 1a/1b resources for HARQ-ACK for time division duplex signalling based on an index of the first enhanced control channel element used for transmission of a corresponding EPDCCH downlink assignment in a downlink subframe, a subframe index m being a relative index of the downlink subframe in which the EPDCCH downlink assignment is transmitted, and one or more configured parameters, said apparatus characterized in that a dynamic offset modifier is one of the one or more configured parameters and wherein the apparatus is adapted to apply the dynamic offset modifier such that the dynamic offset modifier depends on the subframe index m, wherein multiple sets of dynamic offset modifiers are defined to be a matrix C with (M−1) columns and N rows, N corresponding to the number of options to perform dynamic switching, M being the number of downlink subframes associated with an uplink subframe for HARQ-ACK feedback, and the subframe index m is used as one factor to determine the value of the dynamic offset modifier k(n, m), where n is an index of dynamic switching option signalled as downlink control information DCI via EPDCCH.

* * * * *

UNITED STATES PATENT AND TRADEMARK OFFICE
CERTIFICATE OF CORRECTION

PATENT NO. : 9,729,295 B2
APPLICATION NO. : 14/041431
DATED : August 8, 2017
INVENTOR(S) : Li Zhang, Timo Erkki Lunttila and Esa Tapani Tiirola It is certified that error appears in the above-identified patent and that said Letters Patent is hereby corrected as shown below:

In Claim 12:
Column 15, Line 45,

" $n^{(1)}_{PUCCH} = N_{\text{UE-PUCCH-TDD}} * m + n_{eCCE} + N^{(1)}_{\text{UE-PUCCH}} + k$ ," should be deleted and -- $n^{(1)}_{PUCCH} = N^{(1)}_{\text{UE-PUCCH-TDD}} * m + n_{eCCE} + N^{(1)}_{\text{UE-PUCCH}} + k$ -- should be inserted.

In Claim 26:
Column 17, Line 40,

" $n^{(1)}_{PUCCH} = N_{\text{UE-PUCCH-TDD}} * m + n_{eCCE} + N^{(1)}_{\text{UE-PUCCH}} + k$ " should be deleted and -- $n^{(1)}_{PUCCH} = N^{(1)}_{\text{UE-PUCCH-TDD}} * m + n_{eCCE} + N^{(1)}_{\text{UE-PUCCH}} + k$ -- should be inserted.

Signed and Sealed this
Nineteenth Day of September, 2017

Joseph Matal
*Performing the Functions and Duties of the
Under Secretary of Commerce for Intellectual Property and
Director of the United States Patent and Trademark Office*